US012697770B2

(12) United States Patent
Duanmu et al.

(10) Patent No.: US 12,697,770 B2
(45) Date of Patent: Aug. 4, 2026

(54) ADDITIVE MANUFACTURING SYSTEM FOR OBJECT CREATION FROM POWDER USING A HIGH FLUX LASER FOR TWO-DIMENSIONAL PRINTING

(71) Applicant: Seurat Technologies, Inc., Wilmington, MA (US)

(72) Inventors: Ning Duanmu, Nashua, NH (US); James A. DeMuth, Woburn, MA (US); Andrew J. Bayramian, Marblehead, MA (US); Yiyu Shen, Tewksbury, MA (US); Drew W. Kissinger, Carlisle, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 0 days.

(21) Appl. No.: 18/665,088

(22) Filed: May 15, 2024

(65) Prior Publication Data

US 2024/0300167 A1 Sep. 12, 2024

Related U.S. Application Data

(62) Division of application No. 16/712,355, filed on Dec. 12, 2019, now Pat. No. 12,011,873.

(Continued)

(51) Int. Cl.
 *B29C 64/153* (2017.01)
 *B22F 10/28* (2021.01)
 (Continued)

(52) U.S. Cl.
 CPC ............ *B29C 64/153* (2017.08); *B22F 10/28* (2021.01); *B22F 10/31* (2021.01); *B22F 10/32* (2021.01);
 (Continued)

(58) Field of Classification Search
 CPC .......................... B23K 26/125; B23K 26/128; B23K 26/1464; B23K 26/342; B29C 64/153;
 (Continued)

(56) References Cited

U.S. PATENT DOCUMENTS

| | | | |
|---|---|---|---|
| 2014/0247512 A1* | 9/2014 | Scheiding .............. | G02B 23/06 |
| | | | 264/1.21 |
| 2017/0182558 A1 | 6/2017 | Shimizu et al. | |

(Continued)

FOREIGN PATENT DOCUMENTS

WO 2015079200 6/2015

OTHER PUBLICATIONS

Wimmer, A., et al., Influence of the process gas on the laser beam melting process, in: Proceedings of the 7th International Conference on Additive Technologies, ICAT 2018, Oct. 11, 2018, pp. 66-70 (Year: 2018).*

(Continued)

*Primary Examiner* — Philip C Tucker
*Assistant Examiner* — Jimmy R Smith, Jr.
(74) *Attorney, Agent, or Firm* — David R. Stevens; Stevens Law Group

(57) ABSTRACT

A method of additive manufacture is disclosed. The method can include providing an enclosure surrounding a powder bed and having an atmosphere including helium gas. A high flux laser beam is directed at a defined two dimensional region of the powder bed. Powder is melted and fused within the defined two dimensional region, with less than 50% by weight of the powder particles being displaced into any defined two dimensional region that shares an edge or corner with the defined two dimensional region where powder melting and fusing occurs.

10 Claims, 5 Drawing Sheets

Related U.S. Application Data

(60) Provisional application No. 62/779,978, filed on Dec. 14, 2018.

(51) Int. Cl.

| | |
|---|---|
| *B22F 10/31* | (2021.01) |
| *B22F 10/32* | (2021.01) |
| *B22F 10/77* | (2021.01) |
| *B22F 12/41* | (2021.01) |
| *B22F 12/45* | (2021.01) |
| *B22F 12/90* | (2021.01) |
| *B23K 26/12* | (2014.01) |
| *B23K 26/14* | (2014.01) |
| *B23K 26/342* | (2014.01) |
| *B29C 64/364* | (2017.01) |
| *B29C 64/371* | (2017.01) |
| *B33Y 10/00* | (2015.01) |
| *B33Y 40/00* | (2020.01) |

(52) U.S. Cl.
CPC .............. *B22F 12/41* (2021.01); *B22F 12/45* (2021.01); *B23K 26/125* (2013.01); *B23K 26/128* (2013.01); *B23K 26/1464* (2013.01); *B23K 26/342* (2015.10); *B29C 64/364* (2017.08); *B29C 64/371* (2017.08); *B33Y 10/00* (2014.12); *B33Y 40/00* (2014.12); *B22F 10/77* (2021.01); *B22F 12/90* (2021.01)

(58) Field of Classification Search
CPC ... B29C 64/371; B29C 64/393; B29C 64/364; B33Y 10/00; B33Y 30/00; B33Y 40/00; B33Y 50/02; Y02P 10/25; B22F 2201/00; B22F 2201/10
See application file for complete search history.

(56) References Cited

U.S. PATENT DOCUMENTS

2017/0239719 A1 * 8/2017 Buller .................... B22F 12/49
2018/0281236 A1 10/2018 Elgar et al.

OTHER PUBLICATIONS

Sonny Ly, et.al., Metal vapor micro-jet controls material redistribution in laser powder bed fusion additive manufacturing, pp. 1-12, Scientific Reports, Jun. 2017.

* cited by examiner

ADDITIVE MANUFACTURING SYSTEM FOR OBJECT CREATION FROM POWDER USING A HIGH FLUX LASER FOR TWO-DIMENSIONAL PRINTING

CROSS-REFERENCE TO RELATED PATENT APPLICATION

This application is a divisional of U.S. patent application Ser. No. 16/712,355, filed on Dec. 12, 2019, which claims the benefit of U.S. Provisional Patent Application No. 62/779,978, filed on Dec. 14, 2018, both of which are hereby incorporated by reference in their entirety.

TECHNICAL FIELD

The present disclosure generally relates to additive manufacturing and, more particularly, to powder bed fusion additive manufacturing using a high flux laser for two-dimensional printing.

BACKGROUND

Traditional component machining often relies on removal of material by drilling, cutting, or grinding to form a part. In contrast, additive manufacturing, also referred to as three-dimensional (3D) printing, typically involves sequential layer-by-layer addition of material to build a part.

In one high throughput additive manufacturing system, two-dimensional regions or "tiles" can be melted from a metal or other material powder layer using a high flux laser beam. However, quickly melting many types of powders requires an immensely high energy concentration, resulting in generation and drastic volume expansion of the plasma. When plasma sustains and expands its volume, a shockwave is created which serves to push away significant amount of powders around the printed (or laser irradiated) area into surrounding areas. Effectively, this chain reaction of laser beam irradiation, plasma generation, plasma sustaining and expansion, shockwave propagation, and powder movement reduces quality of the printing process.

This is a particular problem for high-power powder bed fusion based additive manufacturing systems. Typical conventional powder bed fusion additive manufacturing systems currently available use individual laser beam of about 300 W to 1000 W in power and 50 micro meter (50 um) to 100 um focused beam diameter. This translates to only about several MW/cm² of laser power flux (for example, a 1000 W circular laser beam with a focused diameter of 100 um has a flux of $[1000 \ W/(\pi*(0.005 \ cm)^2)]=12.74 \ MW/cm^2$), which is sufficient to melt and boil the metal powder, but doesn't reach energy densities likely to generate and sustain plasma. Further, since the melt volume is small, any plasma caused effects are minor. Typically, droplets of metal splashes can be seen during the printing process in conventional systems, but there is little to no plasma initiated shockwave to push away powders around the printed area, causing a "Halo effect" that severely and negatively effects the printing process.

Improved processes and systems are needed to prevent unacceptable halo effects when using high power flux laser beam to quickly melt and solidify the powder layer within the printing area. A useful laser beams power flux for two-dimensional powder bed fusion based additive manufacturing systems can range from hundreds of kW/cm² to even GW/cm² level in some scenarios. Unfortunately, in an argon environment, these levels of laser power flux are typically sufficient to generate and sustain plasma that pushes away powder particles to form unacceptable halos during manufacture.

SUMMARY

To reduce such halos and other detrimental printing effects, in one embodiment an additive manufacturing method using metal or other powders can use an enclosure surrounding a powder bed and having an atmosphere including helium gas. A high flux laser beam, having a power density greater than 100 megawatts/square centimeter, is directed at a defined two dimensional region of the powder bed. Powder is melted and fused within the defined two dimensional region, with less than 10% by weight of the powder particles being displaced into any defined two dimensional region that shares an edge or corner with the defined two dimensional region where powder melting and fusing occurs. In other cases less than 20% by weight of powder particles are ejected into areas outside the defined two dimensional region, in other cases less than 40% by weight of powder particles are ejected into areas outside the defined two dimensional region, in other cases less than 80% by weight of powder particles are ejected into areas outside the defined two dimensional region, in other cases less than 90% by weight of powder particles are ejected into areas outside the defined two dimensional region, in other cases less than 95% by weight of powder particles are ejected into areas outside the defined two dimensional region, in other cases less than 99% by weight of powder particles are ejected into areas outside the defined two dimensional region.

In one embodiment, the helium gas atmosphere is at least 1% helium by volume.

In one embodiment, the helium gas atmosphere in the enclosure is maintained between 0 and 100 bar of absolute pressure.

In one embodiment, the helium gas atmosphere in the enclosure is maintained at a temperature between 20 and 5000 degrees Kelvin.

In one embodiment, wherein the laser beam flux is between 0.1 megawatts per square centimeter and 10 gigawatts per square centimeter.

In one embodiment, the defined two dimensional region of the powder bed is between 0.0025 square centimeters and 2500 square centimeters.

In one embodiment, thickness of the powder layer on the powder bed is between 0.01 micron and 5000 microns.

In one embodiment, a calibration step can be used that includes adjusting at least one of the laser beam flux or area of the defined two dimensional region in response to detected area of a halo formed by a preliminary halo test.

In one embodiment, a detected radius of the halo is greater than 50 microns beyond the boundary of the defined two dimensional area.

In one embodiment, a method of additive manufacture includes providing an enclosure surrounding a powder bed and having an atmosphere including at least 50% helium gas at greater than atmospheric pressure. A laser beam having a flux greater than 100 megawatts/square centimeter can be directed at a defined two dimensional region of the powder bed to melt and fuse powder within the defined two dimensional region.

In one embodiment a method of additive manufacture includes providing an enclosure surrounding a powder bed and having an atmosphere including at least 50% helium gas at less than atmospheric pressure. A laser beam having a flux greater than 100 megawatts/square centimeter can be directed at a defined two dimensional region of the powder bed to melt and fuse powder within the defined two dimensional region.

In one embodiment a method of additive manufacture includes providing an enclosure surrounding a powder bed and having an atmosphere including at least 50% helium gas heated to greater than 20 degrees Celsius. A laser beam having a flux greater than 100 megawatts/square centimeter can be directed at a defined two dimensional region of the powder bed to melt and fuse powder within the defined two dimensional region.

In one embodiment, an atmosphere can contain at least one of Ar, He, Ne, Kr, Xe, CO2, N2, O2, SF6, CH4, CO, N2O, C2H2, C2H4, C2H6, C3H6, C3H8, i-C4H10, C4H10, 1-C4H8, cic-2, C4H7, 1,3-C4H6, 1,2-C4H6, C5H12, n-C5H12, i-C5H12, n-C6H14, C2H3Cl, C7H16, C8H18, C10H22, C11H24, C12H26, C13H28, C14H30, C15H32, C16H34, C6H6, C6H5-CH3, C8H10, C2H5OH, CH3OH, and iC4H8.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
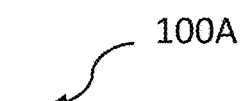
FIG. 1A illustrates a powder layer before response to laser.
Figure 1A:
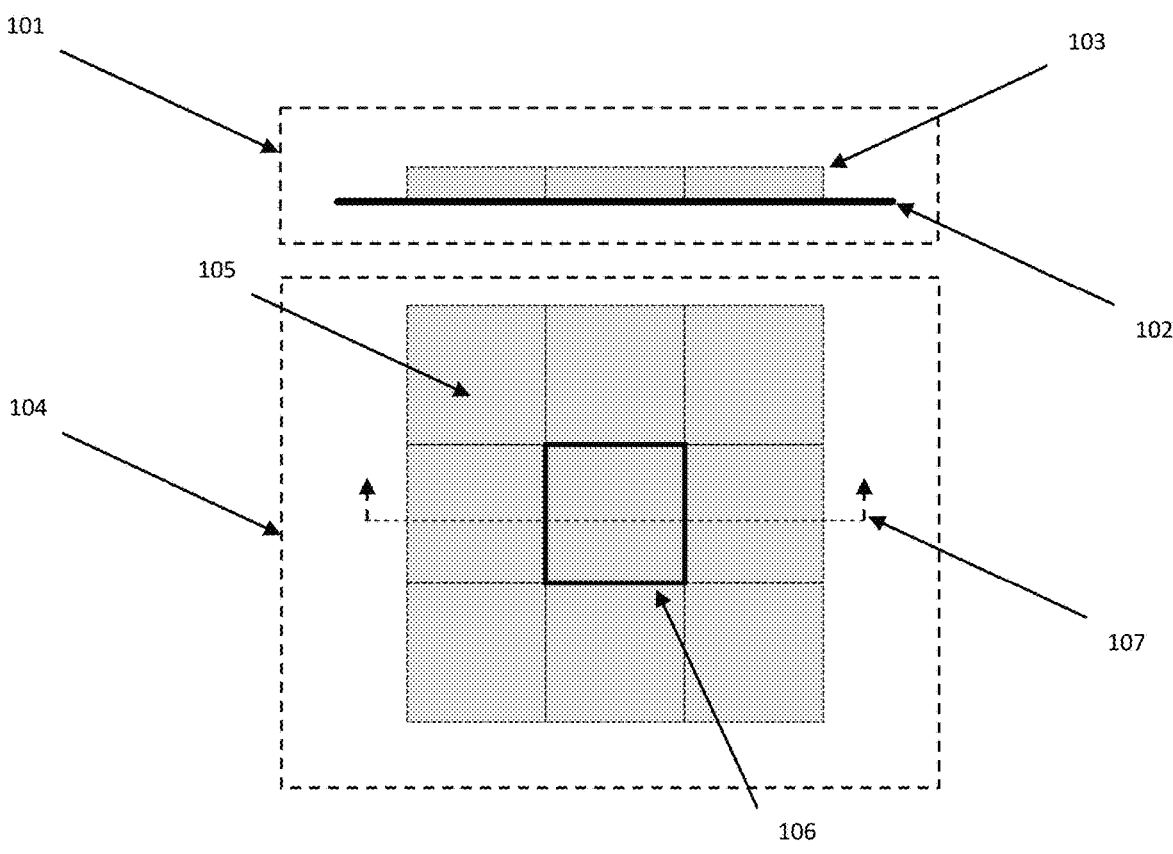

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

An additive manufacturing system which has one or more energy sources, including in one embodiment, one or more laser or electron beams, are positioned to emit one or more energy beams. Beam shaping optics may receive the one or more energy beams from the energy source and form a single beam. An energy patterning unit receives or generates the single beam and transfers a two-dimensional pattern to the beam and may reject the unused energy not in the pattern. An image relay receives the two-dimensional patterned beam and focuses it as a two-dimensional image to a desired location on a height fixed or movable build platform (e.g. a powder bed). In certain embodiments, some or all of any rejected energy from the energy patterning unit is reused.

In some embodiments, multiple beams from the laser array(s) are combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

An energy source generates photon (light), electron, ion, or other suitable energy beams or fluxes capable of being directed, shaped, and patterned. Multiple energy sources can be used in combination. The energy source can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free Electron Laser, Gas Dynamic Laser, "Nickel-like" Samarium Laser, Raman Laser, or Nuclear Pumped Laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical Laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl2) vapor laser. In addition, a new type of laser which uses metal vapor is the so-called alkali metal vapor lasers which includes all the alkali metals as possible laser ions with the current most promising being Rubidium.

A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:YVO4) laser, Neodymium doped yttrium calcium oxoborate Nd:YCa4O(BO3)3 or simply Nd:YCOB, Neodymium glass(Nd:Glass) laser, Titanium sapphire(Ti:sapphire) laser, Thulium YAG (Tm:YAG) laser, Thulium YLF (Tm:YLF), Ytterbium YAG (Yb:YAG) laser, Ytterbium:2O3 (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm+3:Glass) solid-state laser, Chromium doped chrysoberyl (alexandrite) laser, Erbium doped anderbium-ytterbium co-doped glass lasers, Trivalent uranium doped calcium fluoride (U:CaF2) solid-state laser, Divalent samarium doped calcium fluoride (Sm:CaF2) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

The laser beam can be shaped by a great variety of imaging optics to combine, focus, diverge, reflect, refract, homogenize, adjust intensity, adjust frequency, or otherwise shape and direct one or more laser beams received from a laser beam source toward the energy patterning unit. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Energy patterning can include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

A rejected energy handling unit can be used to disperse, redirect, or utilize energy not patterned and passed through the energy pattern image relay. In one embodiment, the rejected energy handling unit can include passive or active cooling elements that remove heat from the energy patterning unit. In other embodiments, the rejected energy handling unit can include a "beam dump" to absorb and convert to heat any beam energy not used in defining the energy pattern. In still other embodiments, rejected beam energy can be recycled using beam shaping optics. Alternatively, or in addition, rejected beam energy can be directed to the article processing unit for heating or further patterning. In certain embodiments, rejected beam energy can be directed to additional energy patterning systems or article processing units.

An image relay receives a patterned image (typically two-dimensional) from the energy patterning unit and guides it toward the article processing unit. In a manner similar to beam shaping optics, the image relay can include optics to combine, focus, diverge, reflect, refract, adjust intensity, adjust frequency, or otherwise shape and direct the patterned image.

An article processing unit can include a walled chamber and bed, and a material dispenser for distributing material.

The material dispenser can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed.

In addition to material handling components, the article processing unit can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals).

A control processor can be connected to control any components of additive manufacturing system. The control processor can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor is provided with an interface to allow input of manufacturing instructions. Use of a wide range of sensors allows various feedback control mechanisms that improve quality, manufacturing throughput, and energy efficiency.

This invention pertains using specific engineered gas as the process gas in powder bed fusion based additive manufacturing process that requires a high laser power flux enough to generate and sustain plasma at some point in the duration of the pulse. There are several necessary properties in such an engineered gas: chemically inert, high ionization energy, high thermal conductivity, and low density (or atomic weight).

It is important that any process gas used in the powder bed fusion based additive manufacturing processes doesn't prohibit the additive manufacturing process due to chemical reactions with the powder during printing. In general, an inert gas satisfies this requirement, and improve the printing process or material properties of printed parts.

Since it is critical to minimize the generation of plasma, high ionization energy makes it more difficult to ionize the gas and initiate the plasma. In some embodiments, plasma may be initiated from evolved vapor/particulates which is formed from ablated/evaporated material from the powder (Fe, Cr, Al, Co, Ti, Si, etc. . . . ), in particular from metal components. This evolution of vapor/particulate material from the surface can happen at such high speeds due to laser heating the powder that a sufficient amount of material can enter the gas area above the area being printed, even while the laser is still firing. The evolved material can have an extremely high absorptivity of the laser light still incident on the tile being printed, and as such, it super-heats, generating a plasma which not only creates a blast wave and "halo" effect, but also begins to reflect and disperse any further incident laser energy. This rejection effect can lower the amount of energy that makes it to print bed and can negatively affect the quality of the printing process within the tile. High thermal conductivity of the process gas allows the gas to quickly conduct away the heat generated from the laser heating and melting process. High thermal conductivity therefore serves the purpose of extinguishing the plasma before plasma volume expansion sustains and therefore minimize the mechanical impact of the shockwave that pushes away the surrounding powders. High thermal conductivity of the process gas also serves to remove the heat from the powder layer's top surface, therefore reduces the vertical temperature gradient in the powder layer and allows more uniform heating and melting of the powder layer. As a result, the higher conductivity of the ideal process gas causes more heat to be transferred into the base (print plate or previous printed layer underneath the current layer) and therefor brings the base temperature up closer to the melting point without melting the top of the current powder layer. This creates beneficial thermal conditions to bond the powder layer to the base plate or previously printed layer underneath the current layer.

While it is ideal to eliminate the plasma in the printing process altogether, if there is still some plasma generated during the process, low atomic weight of the gas helps to reduce the kinetic energy carried in the shockwave and therefore reduce the mechanical impact on the surrounding powders.

Based on the above analyses, several noble and inert/non-reactive gases can be considered as the candidates in the mix of the engineered gas to solve the aforementioned plasma generation and "Halo" problem: Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2,$C_4H_7$, 1,3-$C_4H_6$, 1,2-$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used. In some embodiments, greater than 1% He can be used, while in other embodiments, greater than 10% He can be used, while in other embodiments, greater than 20% He can be used, while in other embodiments, greater than 40% He can be used, while in other embodiments, greater than 80% He can be used, while in other embodiments, 95% or greater He can be used. In addition to the composition of the engineered gas, ranges of the operating temperature and pressure of the engineered gas can also be selected to minimize plasma generation and improve printing quality. Complex molecules and large atomic weight gasses can have benefits related to having larger mass and taking much more force or energy to move. While larger molecules such as sulfur hexafluoride have a lower thermal conductivity than He (similar to Ar), the gas is much denser, and would act to push out other gasses ($O_2$, $H_2O$ vapor, $N_2$, etc. . . . ) that are evolved from the powder during the printing process of heating it up to its melting temperature, and inducing a phase change. These lighter gasses would effectively float atop the much denser gas, and rapidly remove themselves from the process area. Additionally, more complex molecules have vibrational and rotational energy storage modes which noble gasses do not. These additional energy modes increase the specific heat of the gas at high temperatures and would help to reduce ionization potential of the gas by absorbing more energy from the surrounding metal vapor. Additionally, in the case of $SF_6$ (sulfur hexafluoride) if the main inert gas molecule was to be broken up (either through plasma breakup, or through interaction with evolved radicals such as O, C, H, OH, various combinations, various combinations including species from the powder alloy, etc. . . . ) the radicals formed from the breakup would help to scavenge evolved gas during the printing process (O, $O_2$, H, OH, $H_2O$, Fe, Cr, etc. . . . ). Different gasses might be used for printing different materials by changing the atomic nature, density, or temperature of the gas.

Such an engineered gas, predominantly helium, acts to mitigate plasma generation and "Halo" issues. In addition, predominantly helium engineered gases enhance bonding and operation of powder bed fusion based additive manufacturing process within controlled temperature and pressure ranges.

In addition to engineering the species of gas, the operating conditions such as temperature can be used to further enhance the desired heat conduction or heat transfer coefficient away from the tile surface. For example, in the case of an engineered He gas at 1 bar, the thermal conductivity can double from ~0.15 to ~0.3 between 0 C and 600 C. Increasing the pressure in turn can also help this process by increasing the heat transfer coefficient and increasing the amount of energy required to move a blast wave. Enclosure atmospheric temperatures can be set between 20 degrees Kelvin (i.e. cryogenic) and 5000 degrees Kelvin. In some embodiments, the atmospheric temperature of the enclosure can be set between 200 and 600 degrees Celsius.

Adjustment to operating conditions such as pressure can be used to further enhance additive manufacture. Enclosure atmospheric helium gas atmosphere in the enclosure is can be maintained between 0 and 100 bar of absolute pressure. In some embodiments, the atmospheric temperature of the enclosure is below atmospheric pressure. In other embodiments, the atmospheric temperature of the enclosure is above atmospheric pressure. During the process of additive manufacturing, the laser interacts with the powdered material and the substrate, and the melted powder material begins to coalesce. This process has the potential to trap gas bubbles gaps in the material. By sufficiently reducing the pressure of the gas, these bubbles will begin to shrink, and eventually collapse on themselves, generating a higher density material during the melting process. In some cases, this process can occur at between 0.5 and 1.0 bar absolute pressure, in other instances it can occur at 0.25 and 1.0 bar of absolute pressure, in other instances it can occur at 0.1 and 1.0 bar of absolute pressure, in other instances it can occur at 0.01 and 1.0 bar of absolute pressure, in other instances it can occur at 0.001 and 1.0 bar of absolute pressure, in other instances it can occur at 0.0001 and 1.0 bar of absolute pressure, in other instances it can occur at 1E-6 and 1.0 bar of absolute pressure, in other instances it can occur at 1E-6 and 1E-3 bar of absolute pressure, in other instances it can occur at 1E-10 and 1.0 bar of absolute pressure.

Additionally, adjustments to operating conditions such as high pressure at various temperatures can be used to benefit the quality of parts after or during the additive process. Historically, the process of Hot Isostatic Pressing (HIP) is done after a part has been built from additive manufacturing, however there are considerable benefits to introducing it during the process. The HIP process can be operated between 500 and 1,000 bar, and 400 to 1500 C. However, it is not enough to simply operate the print process at high temperature and high pressure as the HIP process is based around compressing gas pockets of lower pressure. To this end, the pressure needs to be cycled at various stages of the print process. The print process would continue at low pressure, and then intermittently it would pause and pressure would be increased at elevated temperature to drive out pores and gas pockets.

Other derivative or alternative methods can include recycle and recirculation of engineered process gas in-situ during the process, or introduction of engineered He containing process gas environment only locally in the printing chamber where laser beam melting the metal powder happens.

Advantageously, using the described engineered gas and operating conditions, plasma generation and volume expansion is suppressed or minimized during printing process. Powder movement and mechanical impact on the surrounding metal powders ("Halo") in response to laser beam melting and fusing is minimized and has insignificant impact on the continuation of aspects of an additive printing process (e.g. "Stitching" together adjacent tiles). Minimum generation and volume expansion of the plasma also can minimize the "blocking" or "scattering" effect of the plasma to the laser beam above the printing area.

High thermal conductivity of the engineered He containing process gas also helps to reduce the vertical temperature gradient across the depth of metal powder layer and therefore create more uniform heating and melting condition. It enables using high power flux laser(s) to quickly heat, melt, and solidify the metal powders for bonding with a base material.

The power levels used in the process, and the amount of "Halo" that occurs, will vary depending on the material used, and environment it is processed in. In some embodiments, 100 kilowatts per square centimeter is enough, in others, more than a gigawatt per square centimeter can be used, or would require mitigation through the use of an engineered process gas at a specific temperature and pressure.

FIG. 1A illustrates a powder layer system 100A in cross and top section before response to a laser. Cross-sectional view 101, taken from slice 107, shows a layer of powder 3 containing possible tiles to be printed, resting on a substrate 102. Top view 104 shows the view of the same grouping of tiles from above. In this example, there is powder in the region of a tile to be printed 106. The tile to be printed is surrounded by powder making up future potential tiles to be printed 105.

Figure 1B:
FIG. 1B illustrates powder movement in response to laser induced plasma under a substantially pure argon atmosphere.
Figure 1B:
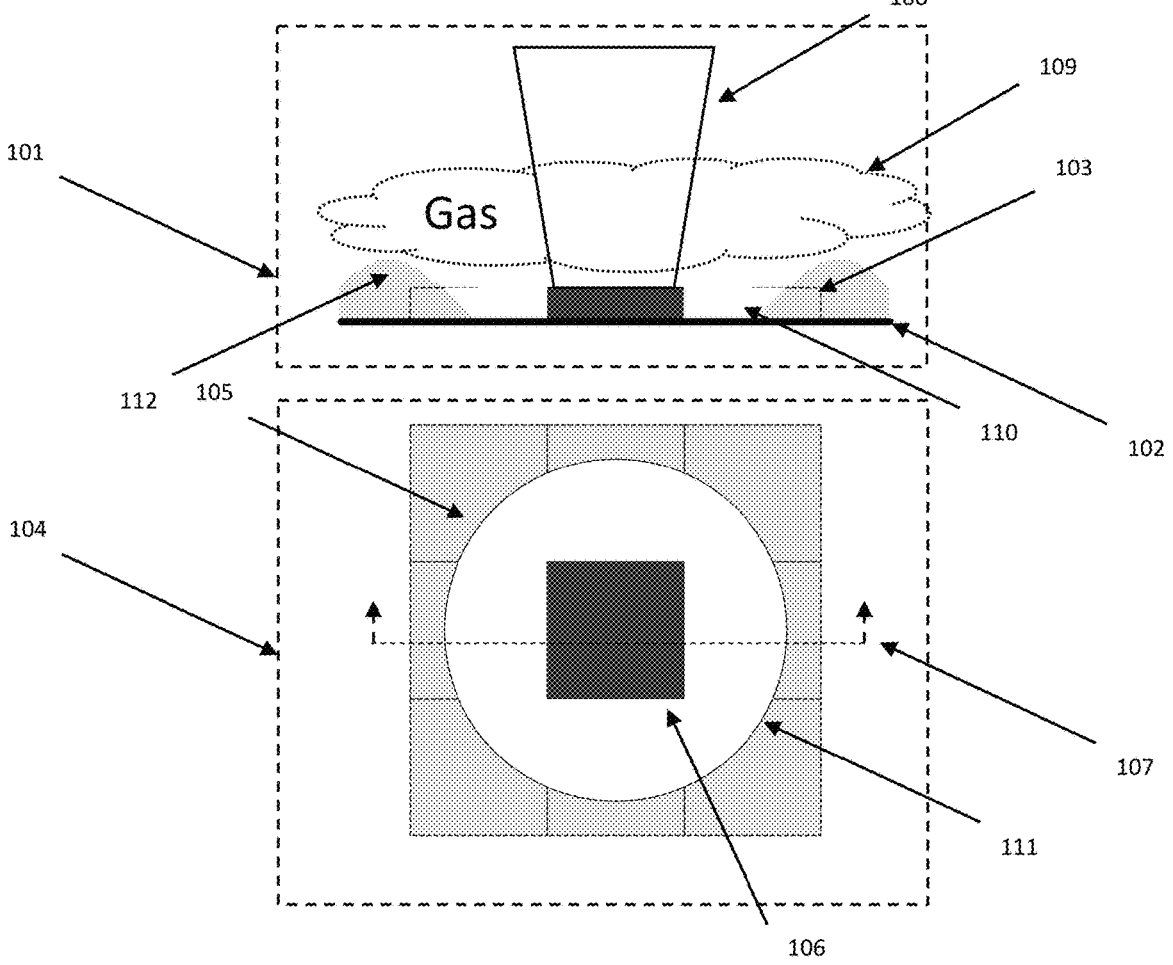

FIG. 1B illustrates a powder layer system 100B in cross and top section responding to a laser beam having a flux greater than 100 megawatts per square centimeter and typically ranging between 100 megawatts and 10 gigawatts per square centimeter. At such power flux levels, significant plasma is induced in a substantially argon atmosphere environment. Cross-sectional view 101, taken from slice 107, shows a layer of powder 103 containing possible tiles to be printed, resting on a substrate 102. Top view 104 shows the view of the same grouping of tiles from above. In this example, there is a tile 106, which has been printed with laser 108, in a substantially argon environment 109. The printed tile is surrounded by powder making up future potential tiles to be printed 105. Because the printing was carried out in argon, vapor generated from the heating of the powder become super-heated by the laser 108, forming a gas expansion wave which pushes powder formerly in a nice uniform layer 103, out of the "Halo" zone 110 next to printed tile 106. The movement of this powder causes further mounding on nearby tiles 112 which changes their layer thickness. The displacement of powder from the "Halo" zone 110 and mounding of powder in nearby tiles 112 cause problems for printing future layers.

Figure 1C:
FIG. 1C illustrates powder movement in response to laser induced plasma under a helium containing atmosphere.
Figure 1C:
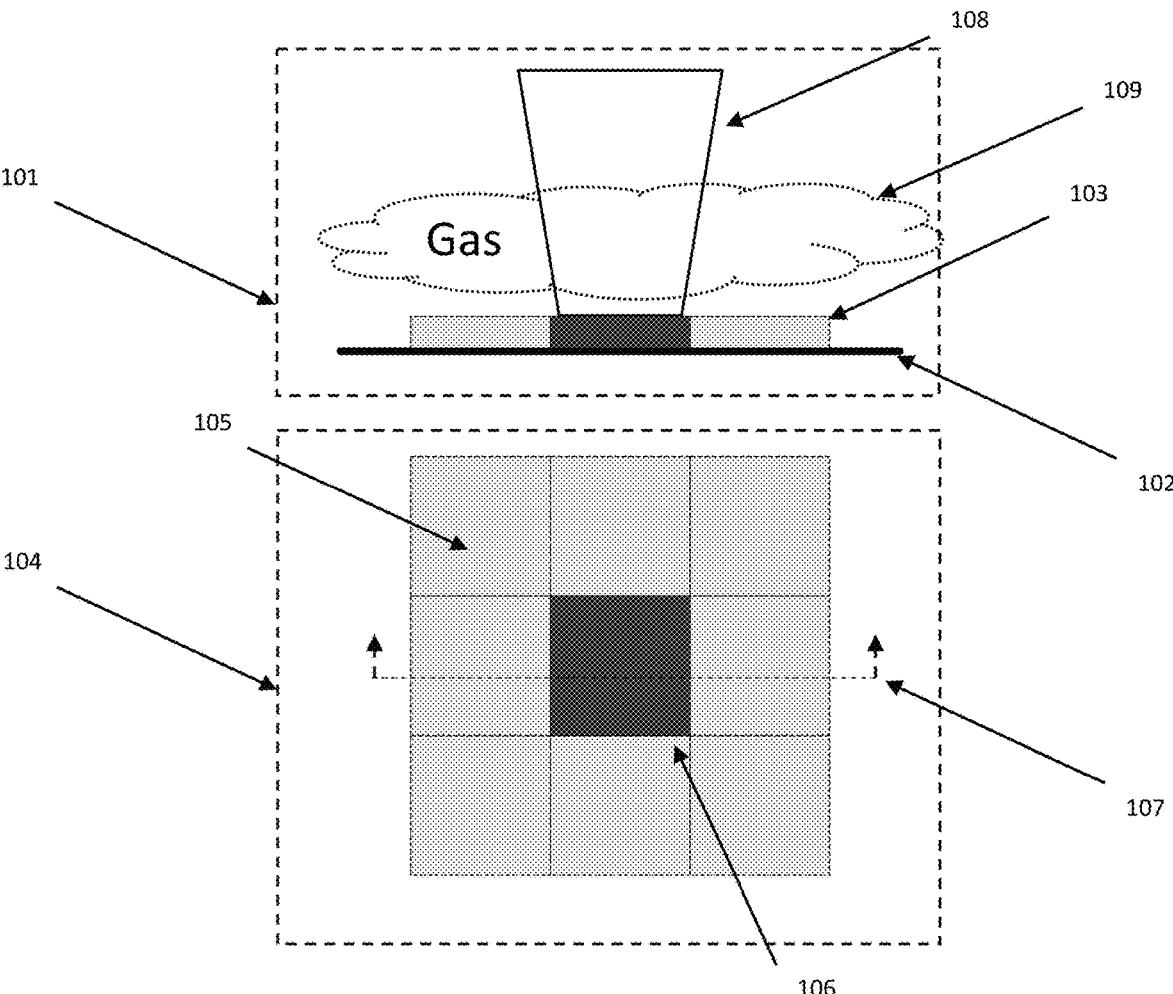

FIG. 1C illustrates a powder layer system 100C in cross and top section in response to a laser beam having a flux greater than 100 megawatts per square centimeter and typically ranging between 100 megawatts and 10 gigawatts per square centimeter, under a predominantly helium containing atmosphere. Cross-sectional view 101, taken from slice 107, shows a layer of powder 103 containing possible tiles to be printed, resting on a substrate 102. Top view 104 shows the view of the same grouping of tiles from above. In this example, there is a tile 106, which has been printed with laser 108, in a predominantly Helium environment 109. The printed tile is surrounded by powder making up future potential tiles to be printed 105. Because the printing was carried out in helium, vapor generated from the heating of the powder does not become super-heated by the laser 108, the gas expansion wave which has the potential to push powder out of a formerly uniform layer 103 is mostly or completely eliminated, allowing for the powder 105 next to the printed tile 106 to be printed in future shots. Furthermore, powder layer 103 is not increased, preventing issues on future layers.

Figure 2:
FIG. 2 illustrates an apparatus for two-dimensional additive manufacture with reduced plasma formation at high laser flux levels which includes a method of determining laser flux and a method of detecting the plasma induced powder movement.
Figure 2:
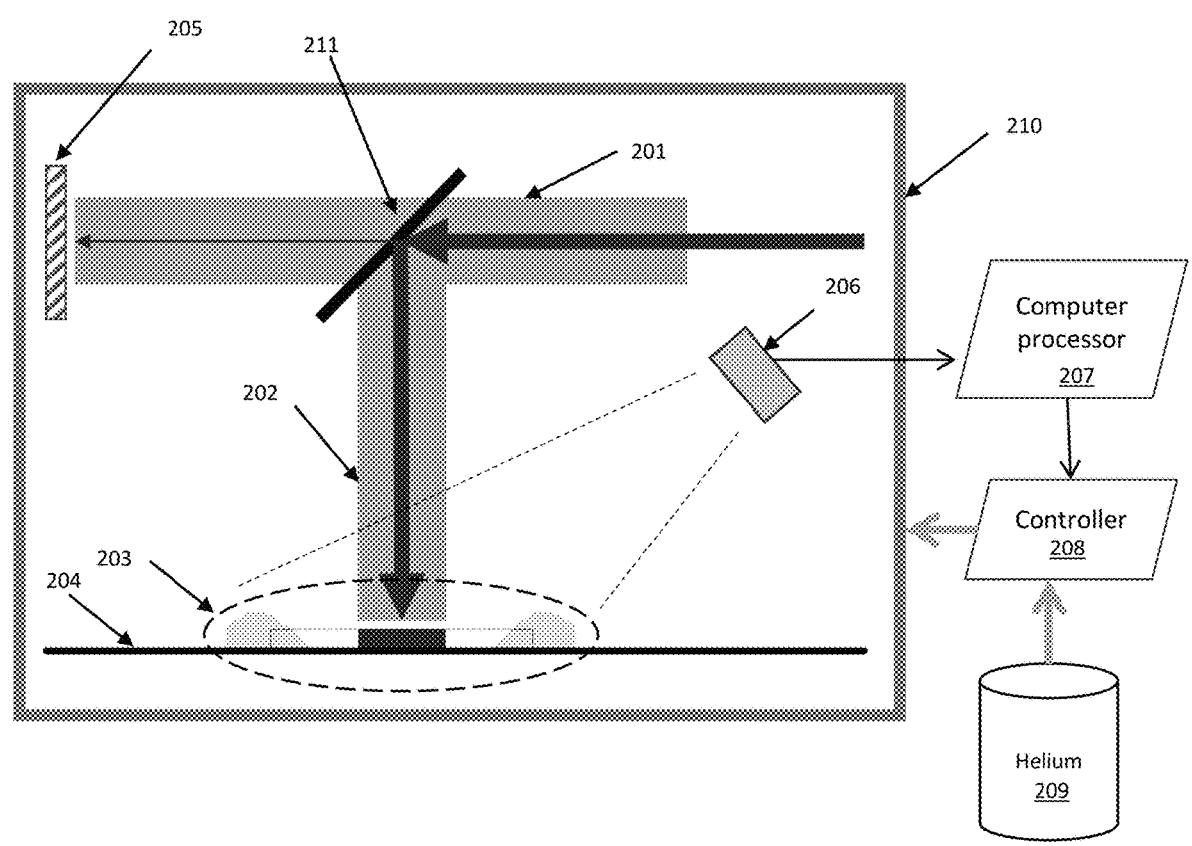

FIG. 2 illustrates a system 200 in which incoming laser beam 201 is directed to the powder bed by mirror 211 forming the printing laser beam 202. An insignificant part of the beam transmits through mirror 211, reaching the laser flux sensor 205 to detect laser flux. A vision system 206 is targeted at the printing area 203 on the base substrate 204. The image taken by the vision system 206 is transferred to a computer processor 207. The controller 208 utilizes the result of image processing to generate control signals to modulate the amount of helium supplied to the printing chamber 210 from the helium tank 209.

Figure 3:
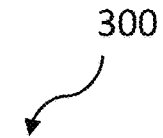
FIG. 3 illustrates the temperature profile through the powder and the base substrate when printing in a substantially pure argon atmosphere versus helium containing atmosphere.
Figure 3:
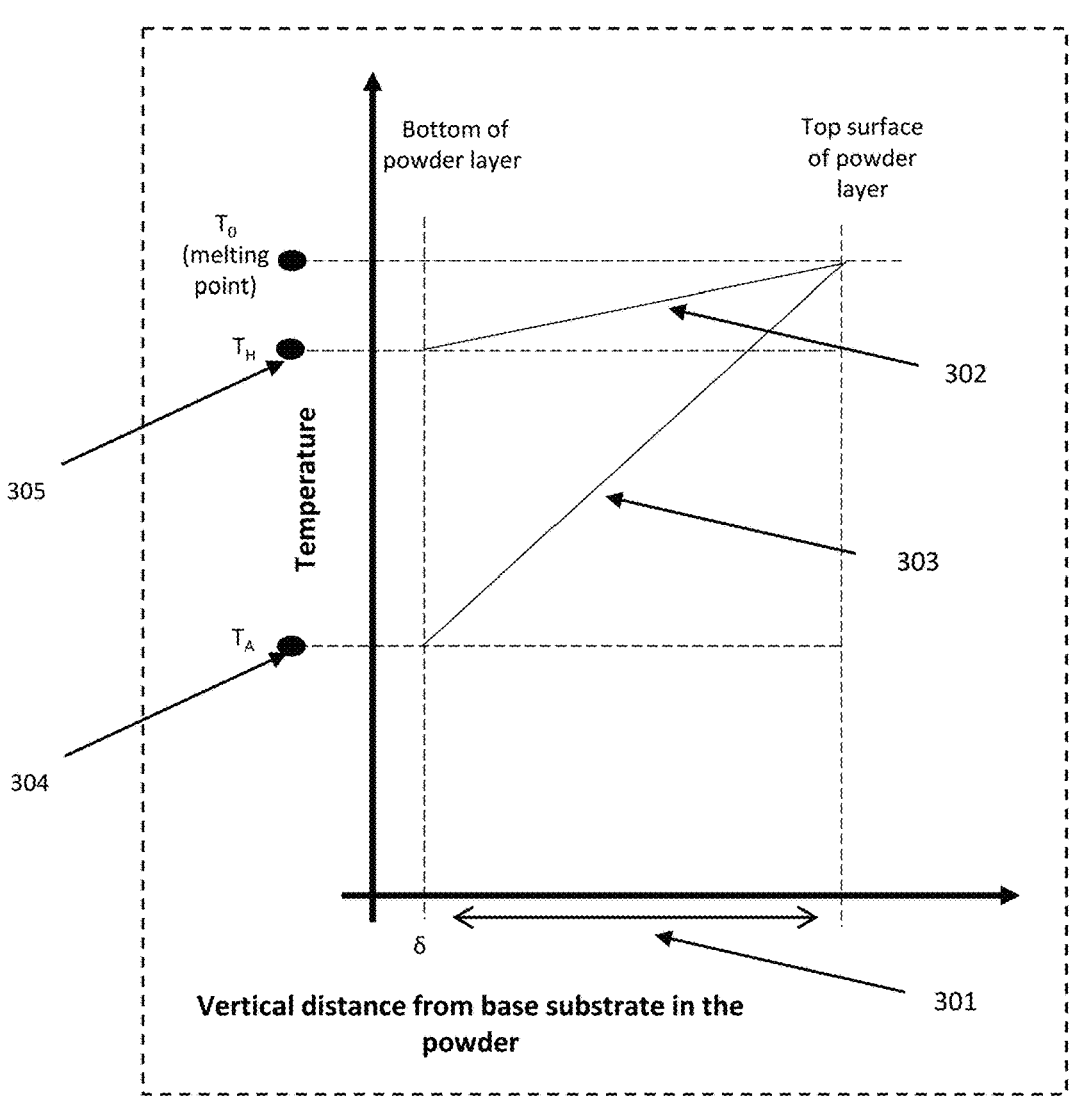

FIG. 3 illustrates the difference in temperature gradient between printing in a substantially pure argon atmosphere 303 and a helium containing atmosphere 302, across the vertical direction in powder layer thickness 301. Upon achieving the same top surface powder melting temperature $T_0$, the temperature at the bottom of the powder layer is much colder in the argon atmosphere $T_A$ 304, then the temperature achieved in the helium containing atmosphere $T_H$ 305. This difference in temperature at the time of melting allows for deeper penetration of the laser, and thus the processing of deeper powder depths than achievable with Argon in the same conditions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:
1. A method of additive manufacture, comprising:
providing an enclosure surrounding a powder bed and having an atmosphere including at least 1% helium gas at greater than atmospheric pressure;

directing a laser beam having a flux greater than 100 megawatts/square centimeter at a defined two-dimensional region of the powder bed; and printing an object by melting and fusing powder within the defined two-dimensional region, wherein less than a threshold percentage of the powder in the defined two-dimensional region is displaced into another two-dimensional region that shares an edge or corner with the defined two-dimensional region, wherein the printing is conducted with the atmosphere in an initial pressure range and is intermittently paused with the atmosphere in an increased pressure range with an elevated temperature range.

2. The method of claim 1, wherein the atmosphere further comprises at least one of Ar, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, and i$C_4H_8$.

3. The method of claim 1, wherein the helium keeps vapor generated by the laser beam heating the powder from being super-heated and push powder out of the defined two-dimensional region.

4. The method of claim 1, wherein the helium is used to ensure that less than 10% by mass of the powder in the defined two-dimensional region is displaced into another two-dimensional region that shares an edge or corner with the defined two-dimensional region.

5. The method of claim 1, wherein the initial pressure range comprises 0.0001 bar to 1.0 bar and the increased pressure range comprises 500 bar to 1000 bar.

6. The method of claim 5, wherein in the elevated temperature range comprises 400° C. to 1500° C.

7. A method of additive manufacture, comprising:

providing an enclosure surrounding a powder bed and having an atmosphere including at least 50% helium gas at less than atmospheric pressure;

directing a laser beam having a flux greater than 100 megawatts/square centimeter at a defined two-dimensional region of the powder bed; and printing an object by melting and fusing powder within the defined two-dimensional region, wherein less than a threshold percentage of the powder in the defined two-dimensional region is displaced into another two-dimensional region that shares an edge or corner with the defined two-dimensional region, wherein the printing is conducted with the atmosphere in an initial pressure range and is intermittently paused with the atmosphere in an increased pressure range with an elevated temperature range.

8. The method of claim 7, wherein the atmosphere further comprises at least one of Ar, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, and i$C_4H_8$.

9. A method of additive manufacture, comprising:

providing an enclosure surrounding a powder bed and having an atmosphere including at least 1% helium gas heated to greater than 20 degrees Celsius;

directing a laser beam having a flux greater than 100 megawatts/square centimeter at a defined two-dimensional region of the powder bed; and printing an object by melting and fusing powder within the defined two-dimensional region, wherein less than a threshold percentage of the powder in the defined two-dimensional region is displaced into another two-dimensional region that shares an edge or corner with the defined two-dimensional region, wherein the printing is conducted with the atmosphere in an initial pressure range and is intermittently paused with the atmosphere in an increased pressure range with an elevated temperature range.

10. The method of claim 9, wherein the atmosphere further comprises at least one of Ar, Ne, Kr, Xe, CO2, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_8H_{12}$, i-$C_8H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, and i$C_4H_8$.

* * * * *